(12) United States Patent
Kurashima et al.

(10) Patent No.: US 12,280,501 B2
(45) Date of Patent: Apr. 22, 2025

(54) ROBOT TEACHING METHOD AND ROBOT WORKING METHOD

(71) Applicant: KAWASAKI JUKOGYO KABUSHIKI KAISHA, Kobe (JP)

(72) Inventors: Kazuki Kurashima, Kobe (JP); Hitoshi Hasunuma, Kobe (JP); Takeshi Yamamoto, Kobe (JP); Masaomi Iida, Kobe (JP); Tomomi Sano, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 244 days.

(21) Appl. No.: 18/012,770

(22) PCT Filed: Jun. 21, 2021

(86) PCT No.: PCT/JP2021/023288
§ 371 (c)(1),
(2) Date: Dec. 23, 2022

(87) PCT Pub. No.: WO2021/261411
PCT Pub. Date: Dec. 30, 2021

(65) Prior Publication Data
US 2023/0249341 A1     Aug. 10, 2023

(30) Foreign Application Priority Data

Jun. 23, 2020 (JP) .................. 2020-107459

(51) Int. Cl.
*B25J 9/16* (2006.01)
*G05B 19/423* (2006.01)

(52) U.S. Cl.
CPC ............. *B25J 9/163* (2013.01); *B25J 9/1697* (2013.01)

(58) Field of Classification Search
CPC ........ B25J 9/163; B25J 9/1697; B25J 9/1664; B25J 9/1656; G05B 19/423;
(Continued)

(56) References Cited

U.S. PATENT DOCUMENTS

| | | | |
|---|---|---|---|
| 7,873,448 B2 * | 1/2011 | Takeda | G06T 7/20 |
| | | | 701/28 |
| 2006/0173577 A1 * | 8/2006 | Takeda | G06T 7/73 |
| | | | 700/245 |

(Continued)

FOREIGN PATENT DOCUMENTS

JP      2013-158847 A      8/2013

*Primary Examiner* — B M M Hannan
(74) *Attorney, Agent, or Firm* — Oliff PLC

(57) ABSTRACT

The robot teaching method includes a pre-registration step, robot operation step, and teaching step. The pre-registration step is for specifying a relative self-position of a measuring device with respect to surrounding environment by measuring the surrounding environment using the measuring device, and registering an environment teaching point that is a teaching point of the robot specified using the relative self-position. The robot operation step for automatically operating the robot so that the relative self-position of the robot with respect to the surrounding environment become equal to the environment teaching point in a state where the measuring device is attached to the robot. The teaching step for registering a detection value of a position and a posture of the robot measured by an internal sensor as teaching information in a state where the relative self-position of the robot with respect to the surrounding environment become equal to the environment teaching point.

12 Claims, 9 Drawing Sheets

(58) Field of Classification Search
CPC ........... G05B 2219/36452; G05B 2219/40613; G05B 2219/36401
USPC ........................................................ 700/253
See application file for complete search history.

(56) References Cited

U.S. PATENT DOCUMENTS

| | | | | |
|---|---|---|---|---|
| 2008/0304707 | A1* | 12/2008 | Oi | G06V 20/10 |
| | | | | 382/103 |
| 2018/0297198 | A1* | 10/2018 | Dan | B25J 9/163 |
| 2020/0348147 | A1* | 11/2020 | Maeda | G01C 21/3691 |
| 2020/0402256 | A1* | 12/2020 | Kobayashi | G05D 1/0251 |

* cited by examiner

Robot Coordinate    Transformation Matrix    Environment Coordinate

ROBOT TEACHING METHOD AND ROBOT WORKING METHOD

TECHNICAL FIELD

The present invention relates primarily to methods for teaching industrial robot.

BACKGROUND ART

As a method of teaching an industrial robot, a method is known in which data relating to the position and the posture of the robot (detected values of internal sensors) are registered after the robot is actually moved to a teaching point using an operating device.

PTL 1 discloses a method of making an industrial robot perform work using visual servoing. The visual servoing is control in which a camera is attached to a robot and the robot is operated so that an image captured by the camera during work matches a teaching image registered in advance. That is, when the visual servoing is performed, the robot is taught by photographing the workplace and the workpiece using the camera.

CITATION LIST

Patent Literature

PTL 1 Japanese Patent Application Laid-Open No. 2013-158847

SUMMARY OF INVENTION

Technical Problems

The teaching method by actually operating the robot requires skill, because it is necessary to operate the robot using the operation device. When the visual servoing is used, it is not possible to easily specify how the robot should be operated so that the photographed image is close to the teaching image during work.

The present invention has been made in view of the circumstances described above, and a primary object of the present invention is to provide a robot teaching method of registering a useful teaching information in a simple manner.

Solution to Problem

Problems to be solved by the present invention are as described above, and solutions to the problems and advantageous effects thereof will now be described.

An aspect of the present invention provides a robot teaching method for teaching an industrial robot as follows. The robot teaching method includes a pre-registration step, a robot operation step, and a teaching step. The pre-registration step is a step for specifying a relative self-position of a measuring device with respect to surrounding environment by measuring the surrounding environment using the measuring device, and registering an environment teaching point that is a teaching point of the robot specified using the relative self-position. The robot operation step is a step for automatically operating the robot so that the relative self-position of the robot with respect to the surrounding environment become equal to the environment teaching point, based on measuring result of the surrounding environment by the measuring device, in a state where the measuring device is attached to the robot. The teaching step is a step for registering a detection value of a position and a posture of the robot measured by a sensor as teaching information in a state where the relative self-position of the robot with respect to the surrounding environment become equal to the environment teaching point.

As a result, an operator can teach the robot only by designating the environment teaching point, so the operator can teach the robot by a simpler method than a teaching method in which the operator actually operates the robot. Also, whereas the teaching information of the visual servoing is an image, the teaching information registered in the present invention is the detection value of the sensor, so the position and the posture of the robot can be properly grasped.

Advantageous Effects of Invention

The present invention can provide a robot teaching method of registering a useful teaching information in a simple manner.

DESCRIPTION OF EMBODIMENTS

Figure 1:
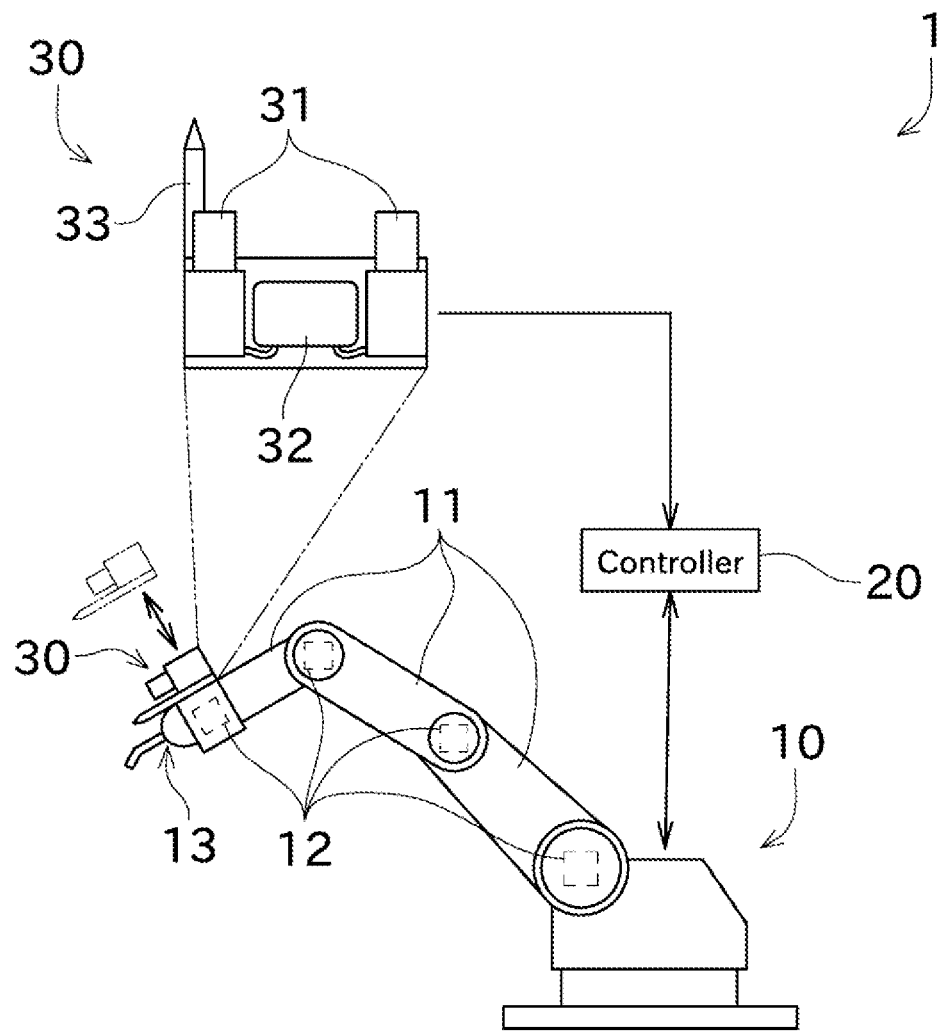
FIG. 1 A configuration diagram of a robot system.

An embodiment of the present invention will now be described with reference to the drawings. First, referring to FIG. 1, a configuration of a robot system 1 of this embodiment will be described. FIG. 1 is a configuration diagram of the robot system 1.

The robot system 1 is placed in a facility such as a factory. The robot system 1 is a system for causing a robot 10 to work. As shown in FIG. 1, the robot system 1 includes a robot 10, a controller 20, and a measuring unit 30. Each device is connected to each other via a wired or wireless network. Although only one set of the robot 10 and the controller 20 is shown in FIG. 1, the robot system 1 may include a plurality of sets of the robot 10 and controller 20.

The robot 10 is an industrial robot. The work performed by the robot 10 is, for example, assembly, welding, painting, cleaning, or the like. The robot 10 is of a teaching playback type. The teaching and playback type is a type in which an operator manually teaches the robot 10 of the operation or work in advance, and the robot 10 is operated such that the taught operation or work is repeated. The robot 10 may be of a type other than the teaching playback type.

The robot 10 includes an arm 11 attached to a base. The arm 11 has a plurality of joints, and each joint is provided with an actuator. The robot 10 changes the position and the posture of the arm 11 by operating an actuator according to an externally input operation command. An internal sensor 12 is arranged at each joint. The internal sensor 12 is a sensor that is attached to the robot 10 and that detects the position and the posture of the robot 10. Specifically, the internal sensor 12 detects the rotation angle or angular velocity of each joint of the arm 11. The internal sensor 12 may be called an encoder. An end effector 13 is attached to the tip of the arm 11 in accordance with the content of the work. The robot 10 works by operating the end effector 13 according to an operation command input from the outside. The position and the posture (orientation) of the end effector 13 can be specified based on a detection value of the internal sensor 12. The arm 11 is provided with an attaching structure (for example, an attaching hole or the like) for attaching the measuring unit 30. This attaching structure is provided in a vicinity of the end effector 13, in other words, further toward a tip end than the joint closest to the tip end (end effector 13 side) of the robot 10. In other words, the attaching structure is attached at a position where it moves and rotates integrally with the end effector 13. The attaching structure of the measuring unit 30 is not limited to be attached at the tip of the robot 10, and may be attached at any position as long as positional relationship with the tip of the robot 10 (end effector 13) can be specified.

The controller 20 is configured to a known computer, and includes an arithmetic device (CPU, etc.) and a storage device (for example, flash memory, HDD, etc.). The controller 20 functions as various means by having the arithmetic device read and execute the program stored in the storage device. For example, the controller 20 creates an operation command for the robot 10 and transmits it to the robot 10 to operate the robot 10. The operation command for the robot 10 includes a command for operating the actuator arranged at joints of the arm 11 and a command for operating the end effector 13.

The measuring unit 30 is a device mainly used for teaching the robot 10. The measuring unit 30 can be manually held and operated by an operator who perform teaching (hereinafter referred to simply as an operator), and is attachable to and detachable from the robot 10. The measuring unit 30 includes a measuring device 31, a processor 32 and a pointer 33. The measuring device 31, the processor 32, and the pointer 33 are fixed to the same housing or the like, and can be handled integrally by the operator. However, if the measuring device 31 and the processor 32 are capable of wireless communication, the processor 32 may be provided at a position away from the measuring device 31. In other words, the measuring unit 30 of this embodiment has a stand-alone configuration that integrally includes the measuring device 31 and the processing device 32, but may have a configuration in which the processor 32 is an external device. Moreover, although the measuring unit 30 of this embodiment is a dedicated product for teaching the robot 10, it may be a general-purpose information processing terminal such as a smart phone. In this case, a camera provided in the smartphone corresponds to the measuring device 31, a SOC provided in the smartphone corresponds to the processor 32, and the pointer (bar-shaped object or laser pointer) attached to the smartphone corresponds to the pointer 33.

The measuring device 31 measures a position and shape (surrounding environment) of an object around the measuring device 31 to detect surrounding environment data indicating the surrounding environment. The measuring device 31 detects surrounding environment data at predetermined time intervals. The measuring device 31 of this embodiment is a stereo camera. The stereo camera includes a pair of imaging elements (such as CCDs) arranged at an appropriate distance from each other. Each imaging element captures an image to obtain an image. By comparing the images acquired by the respective imaging elements, the position of the object or the like included in the acquired image can be calculated. The measuring device 31 may be a LiDAR (Laser Imaging Detection and Ranging). LiDAR is a type of three-dimensional measurement sensor that acquires the position and shape of surrounding objects by emitting radio waves and measuring the time it takes for the reflected radio waves to be received. The measuring device 31 is not limited to a stereo camera and LiDAR, and may be a monocular camera or a ToF (Time of Flight) camera.

The processor 32 processes the surrounding environment data acquired by the measuring device 31. The processor 32 includes an arithmetic device and a storage device as described above. The processor 32 performs SLAM (Simultaneous Localization and Mapping) process on the surrounding environment data. Since the SLAM process is well known, it will be explained briefly. Characteristic points are extracted from the surrounding environment data acquired by the measuring device 31, and moving amount of the characteristic points over a plurality of the surrounding environments is analyzed, then change of the position and the posture of the measuring device 31 are acquired and an environment map is created based on the position of the characteristic points. The environment map is data indicating the three-dimensional positions and three-dimensional shapes of facilities, equipment, and workpieces placed around the measuring device 31 (in this embodiment, the workplace where the robot 10 works). The processor 32 may be arranged at a position away from the measuring unit 30 without attaching the processor 32 to the measuring unit 30.

The pointer 33 is a member for facilitating the work of designating the teaching point of the robot 10 by the operator. Since the pointer 33 is rod-shaped, the work of designating the teaching point becomes accurate. Since the pointer 33 protrudes forward from the measuring device 31, it is possible to easily designate the teaching point. The purpose of the measuring unit 30 is to acquire the self-position of the environment map when the pointer 33 points to the teaching point. Therefore, the relative position of the measuring device 31 and the pointer 33 are fixed. The pointer 33 may be attachable to and detachable from the measuring unit 30. The pointer 33 is not limited to the configuration of pointing with a rod-shaped member, and may be configured to point to a specific position or direction by, for example, emitting a laser.

Figure 2:
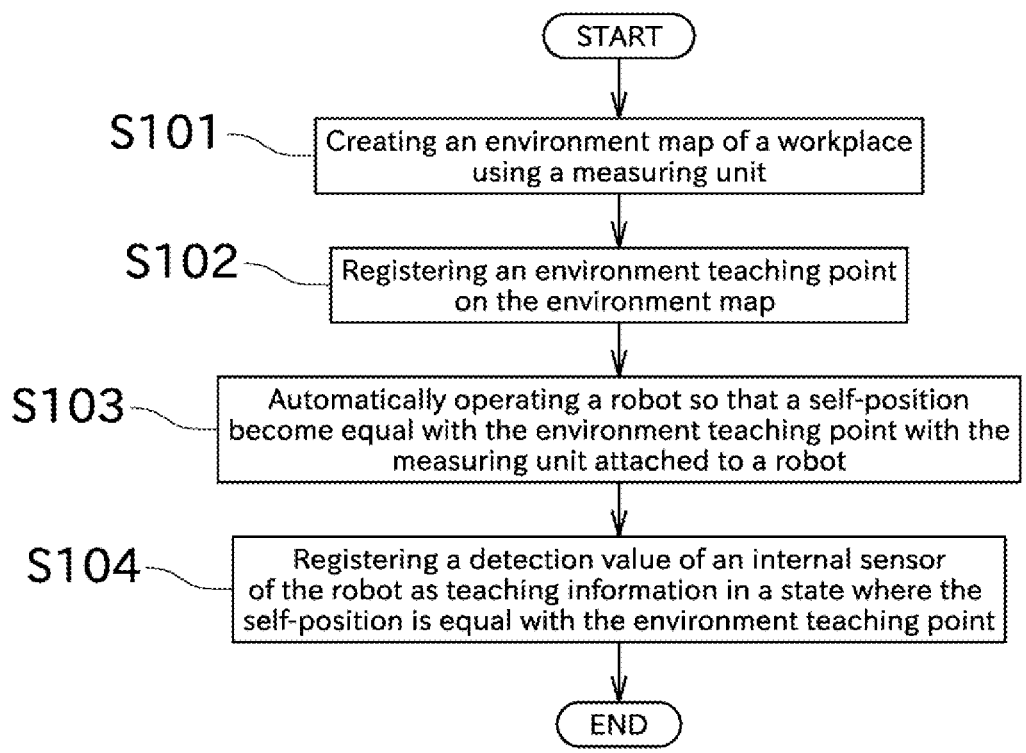
FIG. 2 A process diagram of a robot teaching method.
Figure 3:
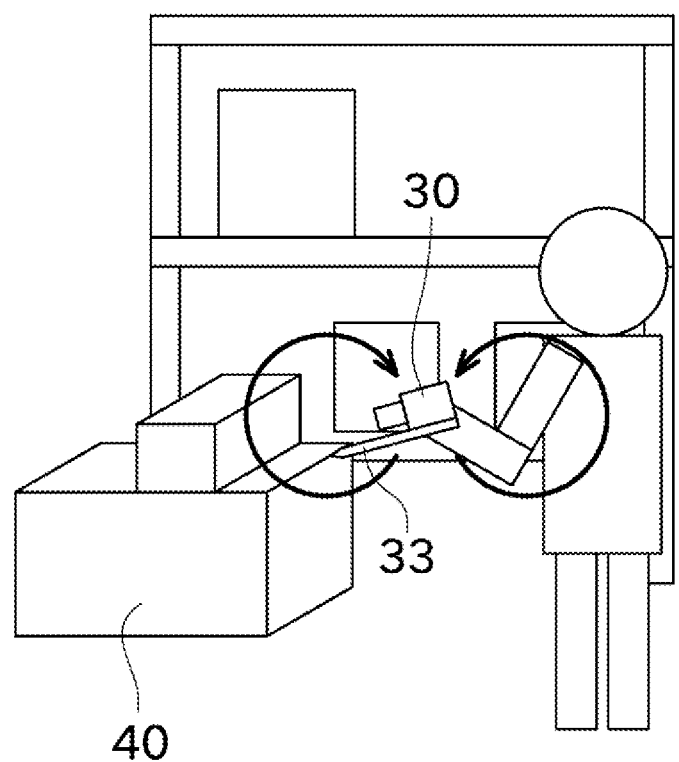
FIG. 3 A schematic diagram of an environment map creating process.
Figure 4:
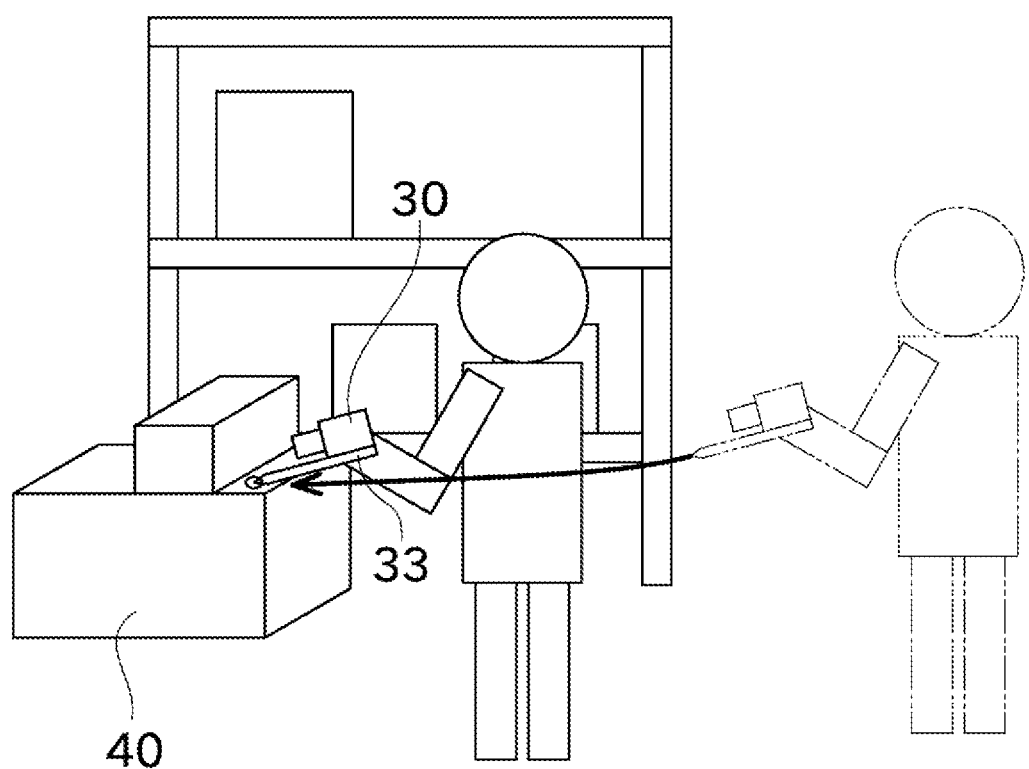
FIG. 4 A schematic diagram of a pre-registration step.
Figure 5:
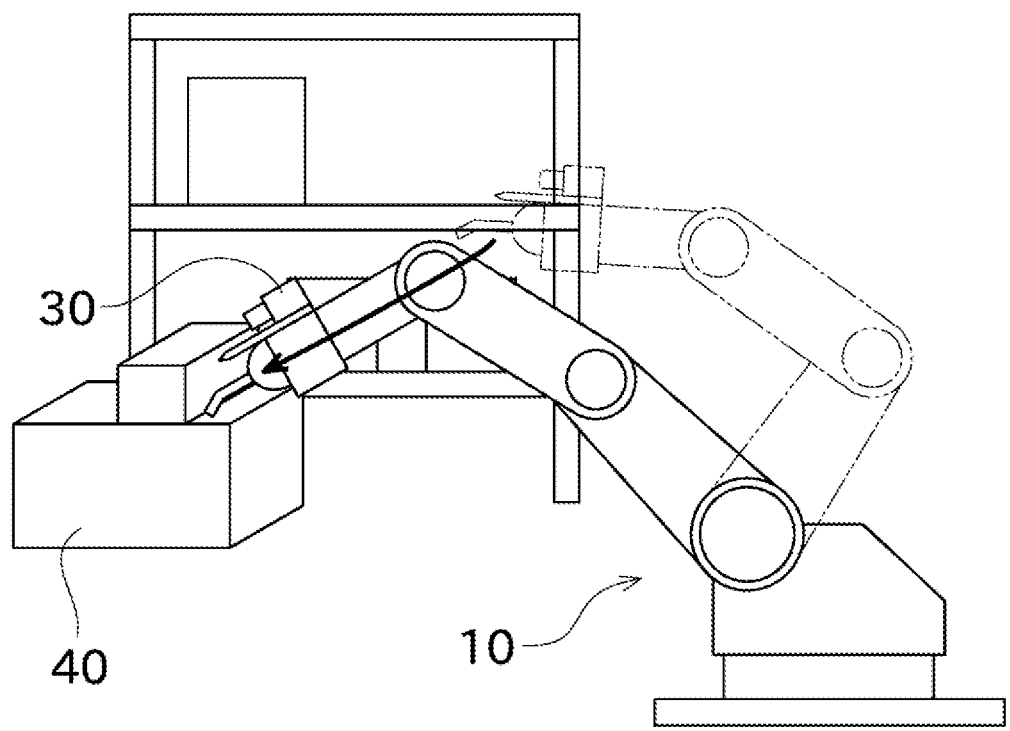
FIG. 5 A schematic diagram of a robot operation step.

Next, the robot teaching method of this embodiment will be described with reference to FIG. 2 to FIG. 5. FIG. 2 is a process diagram of the robot teaching method. FIG. 3 to FIG. 5 are schematic diagrams of each step of the robot teaching method.

First, as shown in FIG. 3, an environment map of the workplace is created using the measuring unit 30 (S101, preparatory step). Specifically, the operator holds the measuring unit 30 by hand, changes the position and the orientation of the measuring unit 30 to detect surrounding environment data of the workplace, and the processor 32 performs SLAM process to the data, an environment map of the workplace is created. In order to create an environment map including the workpiece 40, it is necessary to perform a preparatory step with the workpiece 40 placed at the working position. Instead of the operator, the robot 10 may move the measuring unit 30. Specifically, after attaching the measuring unit 30 to the robot 10, by operating the robot 10 so as to draw a predetermined trajectory, it is also possible to create an environment map of the workplace.

Next, as shown in FIG. 4, environment teaching point on the environment map are registered (S102, pre-registration step). The environment teaching point is a teaching point of the robot 10 specified using a relative self-position with respect to the surrounding environment of the robot 10 (hereinafter referred to as surrounding environment) in the workplace. In this embodiment, the environment teaching point is described in the coordinate system of the environment map. That is, in this embodiment, coordinate values on the environment map are used as an example of "relative self-position with respect to the surrounding environment". The environment teaching point is a concept that includes not only the three-dimensional position but also the orientation (for example, rotation angles around three axes). Registering the environment teaching point means storing the environment teaching point (coordinate values of the environment map) in, for example, the measuring unit 30 or the storage of the controller 20.

In this embodiment, the environment teaching point is specified in actual space. Specifically, as shown in FIG. 4, the operator holds the measurement unit 30 by hand and moves the measuring unit 30 to a position to be registered as a teaching point. At this time, the operator moves the measuring unit 30 while watching the position and orientation of the pointer 33. A positional relationship between the pointer 33 and the end effector 13 is predetermined. For example, it may be determined that the position of the tip of the pointer 33 corresponds to the position of the tip of the end effector 13, or a position offset by a predetermined distance from the tip of the end effector 13 (for example, 5 cm below) corresponds to the tip of the end effector 13. The operator adjusts the measuring unit 30 to an appropriate position while considering the positional relationship. After that, by operating an operation unit (not shown) of the measuring unit 30 by the operator, the self-position of the environment map in that state is acquired. If the positional relationship between the pointer 33 and the end effector 13 in a state where the measuring unit 30 is attached to the robot 10 is equal with the positional relationship between the pointer 33 and the end effector 13 defined above, the self-position obtained is registered as the environment teaching point. If these positional relationships are different, coordinate values calculated by adding a correction value for resolving the difference to the self-position acquired above are registered as the environment teaching point.

Also, the environment teaching point can be specified in the displayed environment map. In this case, the controller 20 displays the environment map on a certain display (the display provided in the control device 20, or the display of the information device owned by the operator, etc.), and accepts input of the environment teaching point by the operator. While confirming the environment map, the operator designates the environment teaching point by, for example, clicking the environment teaching point on the environment map or by inputting the coordinate value of the environment coordinate. The environment teaching point designated in the manner is registered. Since the environment map is created by the SLAM process, a three-dimensional model of the workplace and the robot 10 is not essential, so there is a possibility that the labor of the operator can be reduced. The acquired environment map can be edited by the operator. By specifying an area on the environment map by the operator, the information in the specified area become invalidate, the specified area can be used for estimating the self-position with priority. The specified area may be designated by placing a marker on the environment map.

It is not essential to create the environment map. That is, if the self-position relative to the surrounding environment can be specified, the self-position can be used as the environment teaching point, so the environment teaching point can be specified without using the environment map. In this case, the preparatory step can be omitted. Specifically, since the surrounding environment can be measured by using the measuring device 31 of this embodiment, the self-position relative to the surrounding environment can be specified. In addition, in order to increase the accuracy of specifying the self-position, it is more preferable to register in advance information about objects placed in the surroundings or to place markers or the like in the surroundings.

In this embodiment, the images acquired by the measuring device 31 until the operator aligns the measuring unit 30 with the teaching point are stored in the controller 20, an external server, or the like. This type of images may show the operator's intention of determining the teaching point based on what kind of considerations. Therefore, by saving the images for at least a certain period after the teaching without deleting the images after the teaching is completed, the intention of the teaching can be confirmed later. Since a move is an array of images acquired at time intervals, the expression "saving images" also includes saving a movie.

Next, with the measuring unit 30 attached to the robot 10, the robot 10 is automatically operated so that the self-position of the measuring unit 30 become equal with the environment teaching point (S103, robot operation step). Since the measuring unit 30 is attached to the robot 10, the self-position of the measuring unit 30 is included in the self-position of the robot 10 (a point different from the measuring unit 30 may be the position of the robot 10). Also, the robot 10 can be automatically operated by the following method. That is, the processor 32 can calculate the current self-position on the environment map (in other words, the coordinate value in the environment coordinate can be calculated). The controller 20 can calculate the current position and posture of the robot 10 based on the detection values of the internal sensor 12 (in other words, the coordinate value in robot coordinate can be calculated). Therefore, it is possible to acquire the correspondence relation between the coordinate value in the environment coordinate and the coordinate value in the robot coordinate. By changing the position or posture of the robot 10 and acquiring the coordinate value in the environment coordinate and the robot coordinate, it is possible to acquire a plurality of such correspondence relation. The environment coordinate and the robot coordinate basically correspond one-to-one. As described above, a transformation matrix (conversion data) for converting environment coordinate and robot coordinate can be created based on a plurality of correspondence relations.

As a result, for example, the self-position calculated by the measuring unit 30 can be converted into coordinate value of the robot coordinates, so the robot 10 can be controlled based on the robot coordinate. Moreover, in order to improve the accuracy of the transformation matrix, a new correspondence relation may be acquired at a predetermined timing, and the transformation matrix may be updated based on the new correspondence relation. Alternatively, a value acquired by converting the environment teaching point into a coordinate value of robot coordinate using transformation matrix may be used as the target value. The method of automatically operating the robot 10 is not limited to the above, for example, the robot 10 may be controlled based on the environment coordinate, or the robot 10 may be controlled using visual servoing.

Next, the detection value of the internal sensor 12 of the robot 10 is registered as teaching information in a state where the self-position is equal with the environment teaching point (S104, teaching step). Registering the teaching information means that the teaching information is stored in the controller 20.

In this embodiment, the position and the posture of the robot 10 may be detected using a sensor other than the internal sensor (for example, an external sensor that measures the robot 10 from the outside). When the external sensor is used, the detection value regarding the position and the posture of the robot 10 detected by the external sensor serve as the teaching information. When the external sensor is used, it is preferable to register information for converting the detection value of the position and the posture of the robot 10 detected by the external sensor (or the difference between the target detection value and the current detection value) into the operation command in which the controller 20 outputs the robot 10.

In the teaching method of this embodiment, the robot 10 is automatically moved in the robot operation step by registering the environment teaching point in advance. In a previous teaching method, it is necessary to move the robot to the teaching point using the operation device. In addition, skill is required to operate the operation device. Therefore, in this embodiment, the robot can be taught in a simpler manner than the previous teaching method. The teaching information registered in this embodiment is the same as the teaching information obtained by the previous teaching method.

The teaching method described above can be used not only when newly registering teaching information but also when updating existing teaching information.

Figure 6:
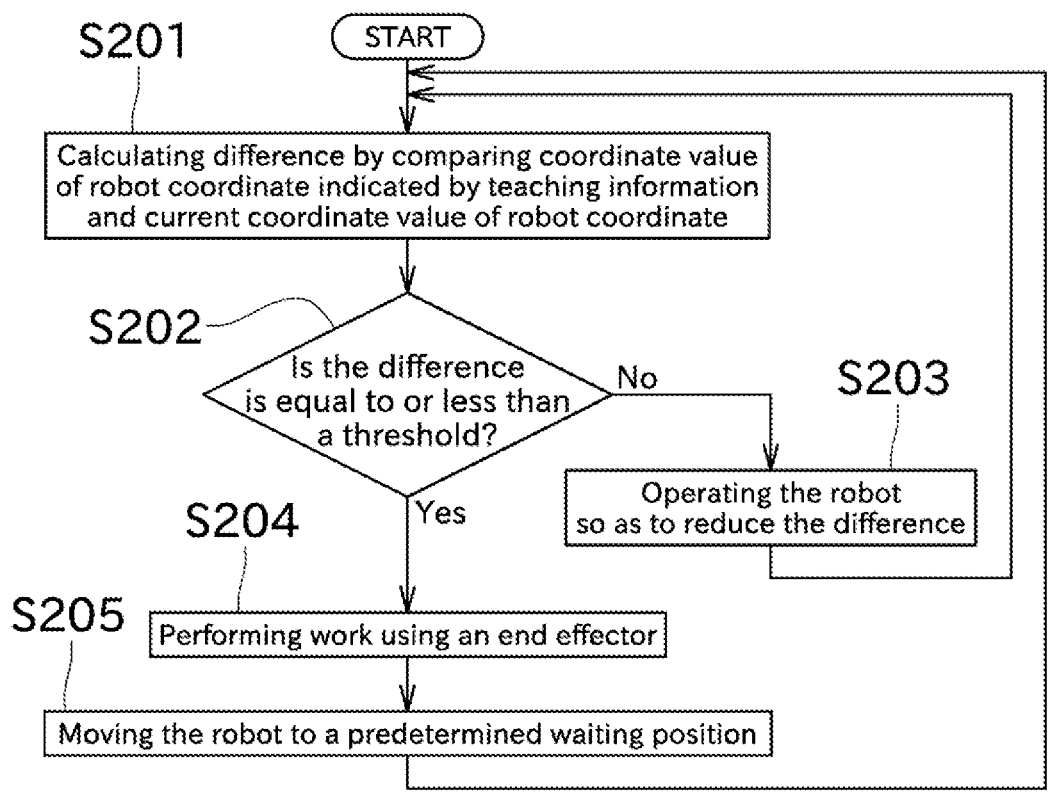
FIG. 6 A flowchart of a work without attaching a measuring device to robot.
Figure 7:
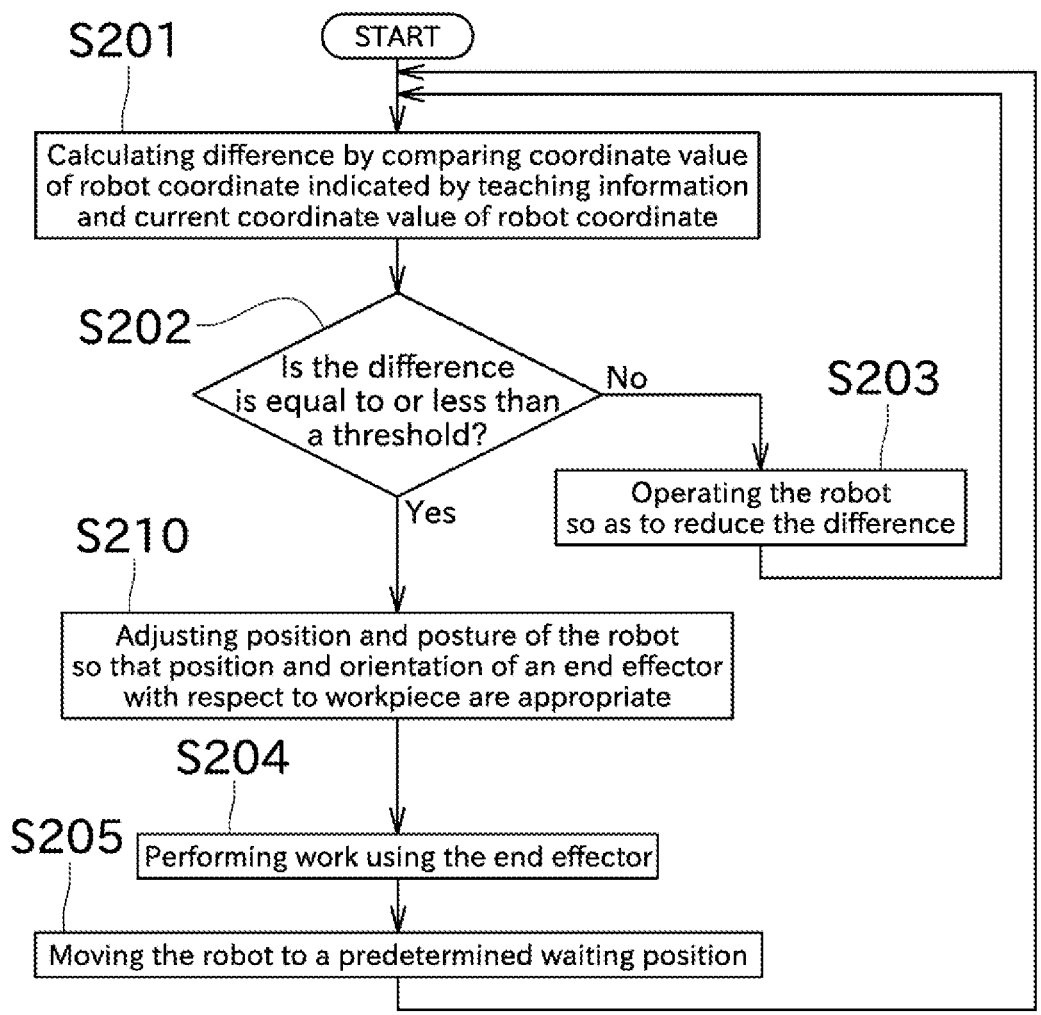
FIG. 7 A flowchart of a work with attaching a measuring device to robot.

Next, a method for causing the robot 10 to work using the teaching information registered by the above method will be briefly described with reference to FIG. 6 and FIG. 7.

Since the teaching information of the robot 10 is the detection value of the internal sensor 12, the robot 10 can work without attaching the measuring unit 30. However, under certain conditions, it may be preferable to work with the measuring unit 30 attached.

First, the processes performed by the controller 20 when the robot 10 works without attaching the measuring unit 30. The controller 20 compares the coordinate value of the robot coordinate indicated by the teaching information and the current coordinate value of the robot coordinate to calculate the difference (S201 in FIG. 6). The controller 20 determines whether or not the difference is equal to or less than a threshold (S202). If the difference is more than the threshold, the controller 20 operates the robot 10 so as to reduce this difference (S203). If the difference is equal to or less than the threshold, the controller 20 causes the work using the end effector 13 (S204). After that, the controller 20 moves the robot 10 to a predetermined waiting position (S205), and performs the same processes to the new workpiece 40 again.

The advantage of performing work without attaching the measuring unit 30 is that the introduction cost of the robot system 1 is lower than when using visual servoing. In other words, the measuring unit 30 is required during teaching, but the measuring unit 30 is not required during work. Therefore, by teaching a plurality of robots 10 with one measuring unit 30, the required number of measuring units 30 is reduced.

When a plurality of robots 10 of the same type are introduced and each robot 10 performs the same work, teaching information created when teaching one robot 10 can be diverted to another robot 10. Specifically, the teaching information registered in the controller 20 which controls the certain robot 10 is registered in the controller 20 that controls another robot 10. Thereby, the labor of teaching can be reduced. Instead of the teaching information, the environment teaching point may be diverted. In this case, it is necessary for each robot 10 to automatically operate the work with attaching the measuring unit 30 (the robot operation step), but the work of registering the environment teaching point using the measuring unit 30 by the operator may perform once (the pre-registration step). By this method, it is possible to create the teaching information in consideration of individual differences for each robot 10.

Next, processes performed by the controller 20 when the measuring unit 30 is attached and work is performed will be described. FIG. 7 shows the processes when the measuring unit 30 is attached and work is performed. The processes other than step S210 are the same as when the work is performed without the measurement unit 30 attached (that is, the processes of S201 to S205 are common regardless of whether the measuring unit 30 is attached or not). By attaching the measuring unit 30, the position of the workpiece 40 can be detected. As a result, even when the position of the workpiece 40 is slightly deviated from the predetermined position, for example, it is possible to perform appropriate work. Specifically, the controller 20 adjusts the position and the posture of the robot so that the position and the orientation of the end effector 13 with respect to the workpiece 40 are appropriate after it is determined that the difference is equal to or less than the threshold (that is, after step S202). (S210).

Specifically, during the teaching step (S104), the relative position of the workpiece 40 with respect to the self-position in a state where the self-position coincides with the environment teaching point is additionally registered in advance. The relative position of the workpiece 40 indicates an appropriate positional relationship between the robot 10 (end effector 13) and the work 40. In step S210, based on the measuring result of the measuring device 31, the relative position of the workpiece 40 with respect to the current self-position is specified. The current relative position of the workpiece 40 and the pre-registered relative position of the workpiece 40 are compared to acquire a difference, and the robot 10 is operated so as to reduce the difference. As a result, even when the position of the workpiece 40 is slightly deviated from the predetermined position, it is possible to perform appropriate work. If the pointer 33 is attachable and detachable, the pointer 33 may be removed during work.

Figure 8:
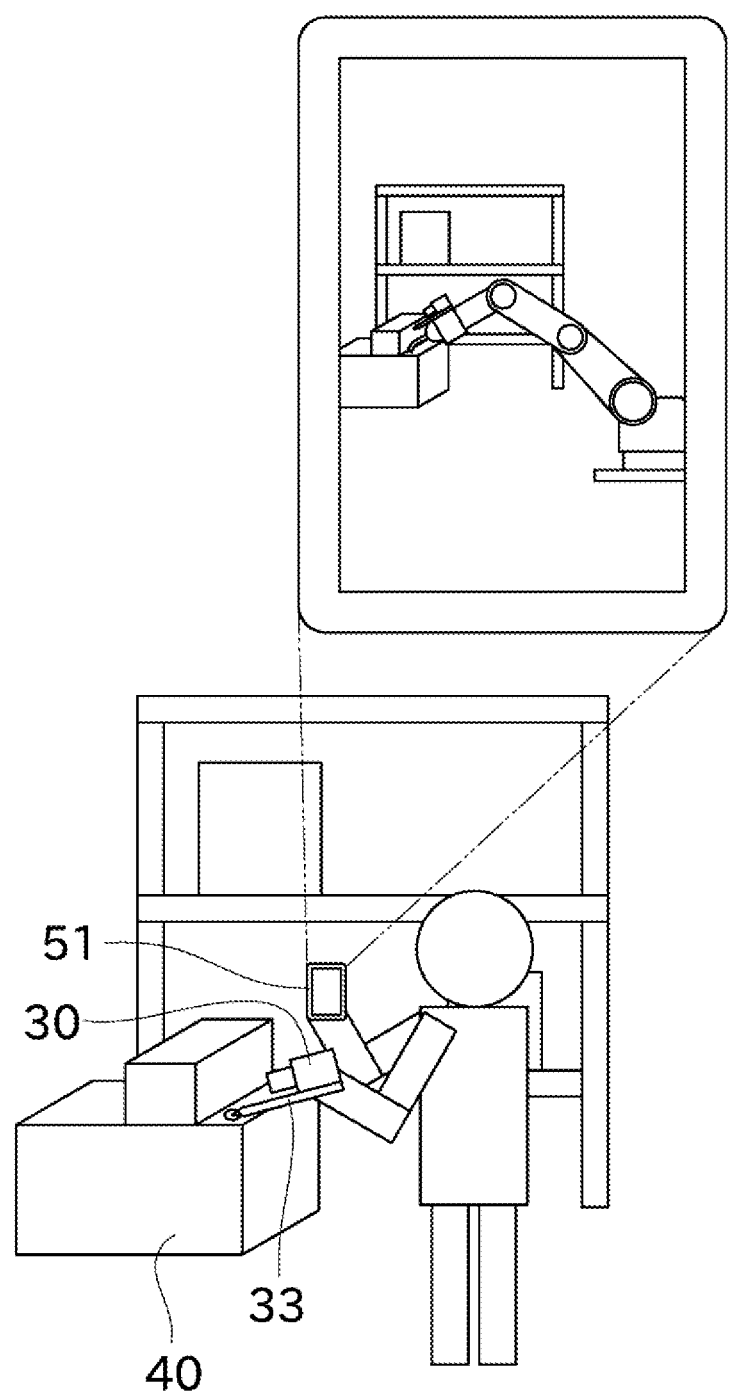
FIG. 8 A schematic diagram of displaying a support virtual image on an information device.

Next, an application example of this embodiment will be described. First, with reference to FIG. 8, an application example of displaying a support virtual image on an information device 51 during the pre-registration step will be described.

The support virtual image is an image in which the robot 10 corresponding to the current position and orientation of the measuring unit 30 is arranged in the virtual space. By viewing the support virtual image, the operator can easily check whether the robot 10 is interfering with other objects in the workplace. It is also possible to confirm whether or not the position and orientation designated by the operator can be realized (whether or not the robot 10 can take the designated posture). In addition, the support virtual image is an image showing not only the specific posture of the robot 10 but also the range of postures that the robot 10 can take, in other words, the angles or positions that can be achieved by the robot 10 (especially the hands of the robot 10).

In this embodiment, the support virtual image is displayed on the display (output device) of the information device 51 (portable device) that can be held by the operator, or if there is another display at the workplace, for example, the support virtual image may be displayed on the display. Moreover, the support virtual image may be output to various devices capable of outputting images (for example, a projector or a head-mounted display) without being limited to the display. In this embodiment, the information device 51 performs the process of creating the support virtual image, but another device may create the support virtual image and transmit it to the information device 51.

An example of a method for creating the support virtual image will be described below. In order to create the support virtual image, a three-dimensional model (three-dimensional CG data) of the workplace (particularly the workpiece 40) and the robot 10 is prepared in advance and placed in the virtual space. The position of the robot 10 at this point is a provisionally determined position. The information device 51 stores a program in which, outputs the rotation angle of each joint for realizing an input state when the position and orientation of the end effector 13 and the installation position of the robot 10 are input.

During the pre-registration step, the measuring unit 30 calculates the self-position on the environment map and outputs it to the information device 51. The information device 51 acquires the correspondence relation between the positions of the workplaces in the environment map and the positions of the workplaces in the virtual space. Based on these correspondence relations, the information device 51 creates conversion data for converting environment coordinate into virtual space coordinate. The information device 51 identifies the position and the posture of the measuring unit 30 in the virtual space by converting its self-position on the environment map with this conversion data, thereby identifying the position and the posture of the end effector 13 in the virtual space. The information device 51 acquires the rotation angle of each joint of the robot 10 by applying the above program to the specified position and orientation of the end effector 13. If the robot 10 cannot take the designated posture, the information device 51 displays a that matter on the display. If the robot 10 can take the designated posture, the information device 51 draws that state in the virtual space. As described above, the support virtual image is created. The creation method is an example, and another method (for example, a method of creating conversion data using a three-dimensional marker) many be used.

Figure 9:
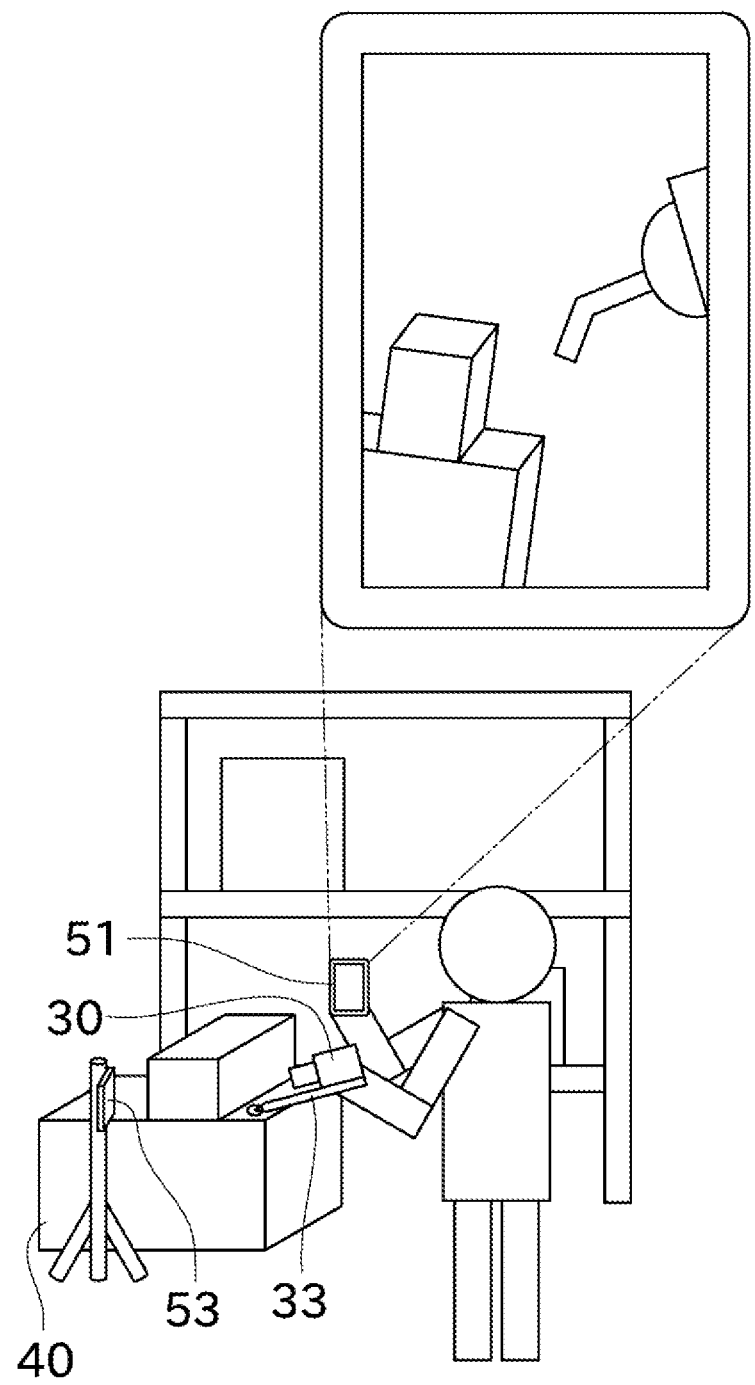
FIG. 9 A schematic diagram of displaying a support AR image on an information device.

Next, an application example of displaying a support AR image on the information device 51 will be described with reference to FIG. 9. AR stands for Augmented Reality.

The support AR image is an image acquired by superimposing the robot 10 (especially the end effector 13) corresponding to the current position and orientation of the measuring unit 30 on the image captured by the camera of the information device 51. By viewing the support AR image, the operator can intuitively grasp the position and orientation of the end effector 13 while registering the environment teaching points. Also, the modifications shown in the support virtual image are also applicable to the support AR image.

A method for creating the support AR image will be described below. The method of superimposing and displaying another image on the image captured by the camera is well known, and there are various creation methods. An example is shown below, and other methods of preparation can also be used. In order to create a support AR image, it is necessary to specify how the position, posture, and size of the robot 10 should be rendered when the robot 10 is superimposed on the image captured by the camera. In order to identify that, an AR marker 53 are placed at the workplace. The position (coordinates in the actual space) where the AR marker 53 is arranged and the size of the AR marker 53 are registered in advance. When the image captured by the camera includes the AR marker 53, the information device 51 identifies the direction in which the AR marker 53 exists based on the position where the AR marker 53 is displayed, and moves the image in the direction in which the AR marker 53 is displayed, the orientation of the AR marker 53 is specified based on the above, and the distance to the AR marker 53 is specified based on the size of the AR marker 53 on the image. As described above, the position and orientation of the AR marker 53 in the workplace are determined in advance. The position and posture of the robot 10 in the workplace can be identified based on the self-position on the environment map. As described above, since the position, orientation, and size of the robot 10 can be specified when the robot 10 is superimposed on the image captured by the camera of the information device 51, the support AR image can be created.

As described above, the robot teaching method of this embodiment includes the pre-registration step, the robot operation step, and the teaching step. The pre-registration step is a step for specifying a relative self-position of a measuring device 31 with respect to surrounding environment by measuring the surrounding environment using the measuring device 31, and registering an environment teaching point that is a teaching point of the robot 10 specified using the relative self-position. The robot operation step is a step for automatically operating the robot 10 so that the relative self-position of the robot 10 with respect to the surrounding environment become equal to the environment teaching point, based on measuring result of the surrounding environment by the measuring device 31, in a state where the measuring device 31 is attached to the robot 10. The teaching step is a step for registering a detection value of a position and a posture of the robot 10 measured by the internal sensor 12 teaching information in a state where the relative self-position of the robot 10 with respect to the surrounding environment become equal to the environment teaching point.

As a result, an operator can teach the robot 10 only by designating the environment teaching point, so the operator can teach the robot 10 by a simpler method than a teaching method in which the operator actually operates the robot 10. Also, whereas the teaching information of the visual servoing is an image, the teaching information registered in this embodiment is the detection value of the sensor, so the position and the posture of the robot 10 can be properly grasped.

In robot teaching method of this embodiment, in the pre-registration step, the environment teaching point is registered based on the self-position in a state where the operator holds the measuring device 31 and moves the measuring device 31 to the teaching point of the robot 10 in actual space.

As a result, the operator can register the environment teaching point with a simple operation of moving the measuring device 31 to the teaching point.

In the robot teaching method of this embodiment, the measuring device 31 is the stereo camera, the image captured in the pre-registration step is stored as the image indicating the operator's teaching intention even after the teaching step is completed.

Thereby, the operator's teaching intention can be confirmed.

In the robot teaching method of this embodiment, the preparatory step is performed before the pre-registration step, in the pre-registration step, an environment map of the surrounding environment is created by measuring the surrounding environment using the measuring device 31 and performing the SLAM process. In the pre-registration step, the environment map is displayed, the input of the environment teaching point by the operator is received, and the teaching point is registered based on the input of the operator.

As a result, the operator can register the environment teaching point with the simple operation of specifying the environment teaching point in the environment map.

In the robot teaching method of this embodiment, in the robot operation step, the plurality of correspondence relations between the environment coordinate which is a coordinate of the surrounding environment in the environment map and the robot coordinate which is a coordinate of the robot 10 based on detection value of the internal sensor 12 are acquired. Next, the conversion data for converting the environment coordinate to the robot coordinate are created based on the plurality of the correspondence relations. Next, the self-position in the environment map created by performing the SLAM process to the measuring result of the measuring device 31 is converted into current coordinate value of the robot coordinate using the conversion data. Next, the robot 10 is controlled based on the current coordinate value of the robot coordinate so that the self-position in the environment map become equal to the environment teaching point.

As a result, the robot 10 can be controlled based on the robot coordinate, so that the robot 10 can be moved to the teaching point in a rational motion.

In the robot teaching method of this embodiment, after creating the conversion data, the correspondence relation is acquired between the environment coordinate and the robot coordinate again, and the conversion data are updated based on the acquired correspondence relation.

As a result, the accuracy of the conversion data can be increased, so that the robot 10 can be operated using more accurate robot coordinate.

In the robot teaching method of this embodiment, the sensor used in the teaching step for detecting the position and the posture of the robot 10 is the internal sensor 12 of the robot 10.

Since the detection value detected by the internal sensor 12 is a value which indicate the position and the posture of the robot 10, it is possible to appropriately grasp in which direction the position and orientation of the robot 10 should be moved during work.

In the robot teaching method of this embodiment, the robot 10 of this embodiment is of the teaching playback type.

Accordingly, the present invention can be applied to general industrial robots.

In the robot teaching method of this embodiment, in the pre-registration step, the support virtual image in which the robot 10 is arranged in the workplace of the virtual space corresponding to the current position and the current orientation of the measuring device 31 is output using output device.

This makes it possible to easily check whether or not the workplace and the robot 10 interfere with each other.

In the robot teaching method of this embodiment, in the pre-registration step, the support AR image in which the robot 10 corresponding to the current position and the current orientation of the measuring device 31 is overlapped with the image photographed by a camera of the information device 51 is displayed on a display of the information device 51.

As a result, the operator can intuitively grasp the position and the orientation of the end effector 13 while registering the environment teaching point by viewing the support AR image.

In the robot teaching method of this embodiment, the robot 10 performs the work without attaching the measuring device 31.

As a result, introduction costs can be reduced compared to visual servoing, which presupposes that the robot 10 is equipped with a camera.

In the robot teaching method of this embodiment, the robot 10 performs the work with attaching the measuring device 31. The controller 20 adjusts the position and the posture of the robot 10 with respect to the workpiece 40 which is a work target.

As a result, even when the position of the workpiece 40 is slightly deviated from the predetermined position, it is possible to perform appropriate work.

REFERENCE SIGNS LIST

1 robot system
10 robot
20 controller
30 measuring unit
31 measuring device
32 processor
33 pointer

The invention claimed is:

1. A robot teaching method for an industrial robot comprising:
   a pre-registration step for specifying a relative self-position of a measuring device with respect to a surrounding environment by measuring the surrounding environment using the measuring device, and registering an environment teaching point that is a teaching point of the industrial robot specified using the relative self-position;
   a robot operation step for automatically operating the industrial robot so that the relative self-position of the industrial robot with respect to the surrounding environment becomes equal to the environment teaching point, based on a measuring result of the surrounding environment by the measuring device, in a state where the measuring device is attached to the industrial robot; and
   a teaching step for registering a detection value of a position and a posture of the industrial robot measured by a sensor as teaching information in a state where the relative self-position of the industrial robot with respect to the surrounding environment becomes equal to the environment teaching point.

2. The robot teaching method according to claim 1, wherein
   in the pre-registration step, the environment teaching point is registered based on the relative self-position in a state where an operator holds the measuring device and moves the measuring device to the teaching point of the industrial robot in actual space.

3. The robot teaching method according to claim 2, wherein
   the measuring device is a stereo camera, and an image captured in the pre-registration step is stored as an image indicating a teaching intention of the operator even after the teaching step is completed.

4. The robot teaching method according to claim 1, further comprising:

a preparatory step, performed before the pre-registration step, in which an environment map of the surrounding environment is created by measuring the surrounding environment using the measuring device and performing a SLAM process, wherein in the pre-registration step, the environment map is displayed, an input of the environment teaching point by an operator is received, and the teaching point is registered based on the input of the operator.

5. The robot teaching method according to claim 1, wherein in the robot operation step, a plurality of correspondence relations between an environment coordinate which is a coordinate of an environment map created by performing a SLAM process to the measuring result of the measuring device and a robot coordinate which is a coordinate of the industrial robot based on a detection value of the sensor are acquired, in the robot operation step, conversion data for converting the environment coordinate to the robot coordinate are created based on the plurality of the correspondence relations, and in the robot operation step, the relative self-position in the environment map created by performing the SLAM process to the measuring result of the measuring device is converted into a current coordinate value of the robot coordinate using the conversion data, and the industrial robot is controlled based on the coordinate value so that the relative self-position in the environment map becomes equal to the environment teaching point.

6. The robot teaching method according to claim 5, wherein after creating the conversion data, the correspondence relation is acquired between the environment coordinate and the robot coordinate again, and the conversion data are updated based on the acquired correspondence relation.

7. The robot teaching method according to claim 1, wherein the sensor used in the teaching step for detecting the position and the posture of the industrial robot is an internal sensor of the industrial robot.

8. The robot teaching method according to claim 1, wherein the industrial robot is of a teaching playback type.

9. The robot teaching method according to claim 1, wherein in the pre-registration step, a support virtual image in which the industrial robot is arranged in a workplace of a virtual space corresponding to a current position and a current orientation of the measuring device is output using an output device.

10. The robot teaching method according to claim 1, wherein in the pre-registration step, a support Augmented Reality (AR) image in which the industrial robot corresponding to a current position and a current orientation of the measuring device is overlapped with an image photographed by a camera of an information device is displayed on a display of the information device.

11. A robot working method in which an industrial robot works using teaching information registered by a robot teaching method, the robot teaching method comprising:

a pre-registration step for specifying a relative self-position of a measuring device with respect to a surrounding environment by measuring the surrounding environment using the measuring device, and registering an environment teaching point that is a teaching point of the industrial robot specified using the relative self-position;

a robot operation step for automatically operating the industrial robot so that the relative self-position of the industrial robot with respect to the surrounding environment becomes equal to the environment teaching point, based on a measuring result of the surrounding environment by the measuring device, in a state where the measuring device is attached to the industrial robot; and a teaching step for registering a detection value of a position and a posture of the industrial robot measured by a sensor as the teaching information in a state where the relative self-position of the industrial robot with respect to the surrounding environment becomes equal to the environment teaching point, wherein in the robot working method, the industrial robot works without attaching the measuring device.

12. A robot working method in which an industrial robot works using teaching information registered by a robot teaching method, the robot teaching method comprising:

a pre-registration step for specifying a relative self-position of a measuring device with respect to a surrounding environment by measuring the surrounding environment using the measuring device, and registering an environment teaching point that is a teaching point of the industrial robot specified using the relative self-position;

a robot operation step for automatically operating the industrial robot so that the relative self-position of the industrial robot with respect to the surrounding environment becomes equal to the environment teaching point, based on a measuring result of the surrounding environment by the measuring device, in a state where the measuring device is attached to the industrial robot; and a teaching step for registering a detection value of a position and a posture of the industrial robot measured by a sensor as the teaching information in a state where the relative self-position of the industrial robot with respect to the surrounding environment becomes equal to the environment teaching point, wherein in the robot working method, the industrial robot works with the measuring device attached thereto, and the position and the posture of the industrial robot with respect to a workpiece which is a work target is adjusted based on the measuring result of the measuring device.

* * * * *